United States Patent
Sirois

(10) Patent No.: US 6,401,056 B1
(45) Date of Patent: Jun. 4, 2002

(54) METHODS AND APPARATUS FOR EVALUATING TOOL PERFORMANCE

(75) Inventor: Robert D. Sirois, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/472,693

(22) Filed: Dec. 27, 1999

(51) Int. Cl.$^7$ ............................................... G21C 17/00
(52) U.S. Cl. ........................ 702/184; 702/184; 702/183
(58) Field of Search ................................. 395/500, 575, 395/500.36, 326; 364/424.06, 431.01, 551.01; 705/1; 702/34; 318/490; 340/680; 707/102; 371/16

(56) References Cited

U.S. PATENT DOCUMENTS

| | | | |
|---|---|---|---|
| 4,051,351 A | | 9/1977 | Mallick, Jr. et al. |
| 4,558,311 A | * | 12/1985 | Forsgren et al. ............. 340/680 |
| 4,866,429 A | * | 9/1989 | Granere ....................... 340/680 |
| 5,070,458 A | * | 12/1991 | Gilmore et al. ......... 364/424.06 |
| 5,347,647 A | * | 9/1994 | Allt et al. .................... 395/575 |
| 5,606,505 A | * | 2/1997 | Smith et al. ............. 364/431.01 |
| 5,777,876 A | * | 7/1998 | Beauchesne ........... 364/468.01 |
| 5,852,351 A | * | 12/1998 | Canada et al. .............. 318/490 |
| 5,893,069 A | * | 4/1999 | White, Jr. ...................... 705/1 |
| 5,914,879 A | | 6/1999 | Wang et al. |
| 5,950,147 A | * | 9/1999 | Sarangapani et al. ....... 702/179 |
| 6,028,994 A | * | 2/2000 | Peng et al. ............ 395/500.36 |
| 6,088,676 A | * | 7/2000 | White, Jr. ...................... 705/1 |
| 6,199,018 B1 | * | 4/2001 | Quist et al. ................... 702/34 |

* cited by examiner

Primary Examiner—John S. Hilten
Assistant Examiner—Douglas N Washburn
(74) Attorney, Agent, or Firm—Karl Vick, Esq.; Damian Wasserbauer, Esq.; Armstrong Teasdale LLP

(57) ABSTRACT

A computer-implemented method for evaluating tool performance is described which includes maintaining tool history data in an electronic memory, updating the tool history data with tool servicing data, determining from the tool history and servicing data a predicted tool remaining useful life, and displaying the predicted useful life on a computer output device. Average tool data is compared to tool benchmark data to determine tool efficiency. Tool servicing, performance and efficiency data are maintained in a spreadsheet format. Data entered into one spreadsheet is used to update a plurality of spreadsheets. The spreadsheet format allows manufacturers to keep abreast of tool performance over time and in a plurality of locations and to anticipate tool rebuild and replacement requirements.

17 Claims, 7 Drawing Sheets

New Die Data Entry Sheet
Be Sure To Fill In All Data Fields Before Creating New Work Sheets

| | | |
|---|---|---|
| Plant Location: | Juarez Casa | Return to Summary |
| Die Identification: | 24.16.133 | |
| Rotor # | 114B904AA | |
| Rotor # | 114B904AB | Create New Work Sheets |
| Stator # | 115C904AD | |
| Manufacturer of Die | AMDO | |
| Dims. (LxWxH) | 49 x 22 x 10 | |
| Tonnage | 93 | Date Die Put Into Service  1-Jan-98 |
| Strip Width x Thickness | 6.412 x .028 | |
| Progression | 6.226 | |
| Total Die Weight | 2330 | |
| Exit Method | Chutes | |
| Serial Number of Die | 24-16-133 | Clear Die Data On This Sheet |
| Amt Punches Enter Die | 0.030 | |
| Number of Rows in Die | 1 | |
| Weekly Line Rate For Die | 300000 | |

| Station # | Punch Desc. | Punch Heoght | Stripper Thickness Minus Any C'bores | Die Height |
|---|---|---|---|---|
| 1 | Pilot Pierce | 1.200 | 0.500 | 0.910 |
| 2 | Vent Holes | 2.375 | 0.380 | 0.910 |
| 2 | Clamp Bolt Holes | 1.500 | 0.380 | 0.910 |
| 2 | Cleat Notches | 1.812 | 0.453 | 0.910 |
| 3 | Rotor Slots | 1.500 | 0.453 | 0.910 |
| 3 | Shaft Hole | 1.500 | 0.453 | 0.910 |
| 4 | Rotor Blank | 1.355 | 0.610 | 0.910 |
| 4 | Stator Trim | 1.355 | 0.610 | 0.910 |
| 6 | Stator Slots | 1.437 | 0.678 | 0.910 |
| 8 | Stator Blank | 1.850 | 1.223 | 0.910 |
| | | | | |
| | | | | |
| | | | | |

| | Rotot 1/2 Blank | (if Any) | Strike Plate = | |
| | Stator 1/2 Blank | (if Any) | Strike Plate = | |

| Do You Want a .090 Safety Margin for Punches  y or n | y |
|---|---|

| For Interlock Dies, Enter The Number of Laminations Per Stack For Loose Lam Dies, Enter The Number One. | 1 |
|---|---|

| Goal Amount For die Grind: (Insert Amt.) | 0.005 |
|---|---|
| Goal Amount for Punch Grind: (Insert Amt.) | 0.006 |
| Goal number of hits per grind: (Insert Amt.) | 1500000 |
| Goal Number of hits per Die Set (Inser Amt.) | 1500000 |

| Historical Data (Optional) | |
|---|---|
| Total Amount Ground From Die Prior to Service Record | 0.007 |
| Total amount Ground From Punches Prior to Service Record | 0.007 |
| Total Number of Hits Prior to Service Record | 3200000 |
| Total Number of Grinds Prior to Service Record | 3 |
| Total Number of Times Die Set in Press Prior to Service Record | 3 |

GE Confidential and Proprietary © Copyright November 16, 1998

FIG. 1

Die Life Data Sheet

| | Date of Last Service on Die | 24-Aug-99 | | Mfg. & S/N | LHC #1 | | 23946 |
|---|---|---|---|---|---|---|---|
| Plant Location | | DeKalb | | Dims. (LxWxH) | 40-1/2 x 20-1/2 x 12 | | Date Die Put Into Service |
| Die Identification | | LHC #1 | | Tonnage | ? | | 3-Oct-94 |
| Rotor # | | RL2B | | Strip Width | 4.265 x .028 | | |
| Rotor # | | N/A | | Progression | 4.265 | | |
| Stator # | | SL2A | | Total Die wgt. | 1950 | | |
| | | | | Exit Method | Loose | | |

| Station # | Punch Desc. | Punch Height | Stripper Thickness Minus Any C'bores | Amount Punches Enter Die | Total Amount Ground From Punches To Date | Remaining Usable Punch Life | Die Height | Total Amount Ground From Die To Date | Remaining Usable Die Life |
|---|---|---|---|---|---|---|---|---|---|
| 1 | Pilot Pierce | 1.200 | 0.515 | 0.030 | 0.053 | 0.512 | 1.100 | 0.043 | 0.682 |
| 1 | Vent Holes | 1.780 | 0.515 | 0.030 | 0.053 | 1.092 | 1.100 | 0.043 | 0.682 |
| 1 | OD Trim | 1.650 | 1.375 | 0.030 | 0.053 | 0.102 | 1.100 | 0.043 | 0.682 |
| 2 | Rotor Slots | 1.100 | 0.515 | 0.030 | 0.053 | 0.412 | 1.085 | 0.043 | 0.667 |
| 2 | Shaft Hole | 1.100 | 0.515 | 0.030 | 0.053 | 0.412 | 1.085 | 0.043 | 0.667 |
| 3 | Cleats | 2.350 | 1.375 | 0.030 | 0.053 | 0.802 | 1.100 | 0.043 | 0.682 |
| 3 | Rotor Blank | 2.350 | 1.375 | 0.030 | 0.053 | 0.802 | 1.100 | 0.043 | 0.682 |
| 5 | Stator Slots | 1.976 | 1.375 | 0.030 | 0.053 | 0.427 | 1.100 | 0.043 | 0.682 |
| 7 | Cutoff | 2.360 | 1.375 | 0.030 | 0.053 | 0.812 | 1.100 | 0.043 | 0.682 |

| Rotor 1/2 Blank (if Any) | | Strike Plate = | |
|---|---|---|---|
| Stator 1/2 Blank (if Any) | | Strike Plate = | |

Punch Life Calculation Includes .090 Safety Margin

Do You Want The .090 Safety Margin Included In The Calculation? y or n?    ON    y    0.09

Insert Your Standard Height Simension For Non Usable Die Life Here    0.375

Check For Punch Rebuild or Repair

Return to Summary

GE Confidential and Proprietary © Copyright November 16, 1998

DIE PERFORMANCE SPREAD SHEET

Return to Summary

Die Demographics

| | |
|---|---|
| Date of Most Recent Service: | 22-Feb-99 |
| Time Period To Date | 1-Jan-98    22-Feb-99 |
| Location: | Juarez Casa |
| Die Identification/Description: | 24-26-133 |
| Enter Punch and Die Cutting Material: | Carbide |

Die Measurements

| | |
|---|---|
| Die Height at Beginnin of Time Period | 1.250 |
| Die Height as of Last Service | 1.219 |
| Punch Height at Beginning of Time Period | 0.750 |
| Punch Height as of Last Service | 0.708 |
| Total Number of Hits To Date | 12320000 |
| Total Number of Grinds To Date | 7 |
| Total Number of Times Die Set | 11 |

Performance Results

| | |
|---|---|
| Total Amount Removed From Die: | 0.031 |
| Total Amount Removed From Punch: | 0.042 |
| Average # Hits Per .001 Die Grind: | 397419 |
| Average # Hits Per .001 Punch Grind: | 293333 |
| Average # Hits Per Die Set: | 1120000 |
| Average # Hits Per Grind: | 1760000 |
| Average Amount of Die Grind: | 0.004 |
| Average Amount of Punch Grind: | 0.006 |

Benchmark Data

| | |
|---|---|
| Enter Goal Hits Per Grind: | 1500000 |
| Enter Goal Amount of Die Grind: | 0.005 |
| Enter Goal Amount of Punch Grind: | 0.006 |
| Enter Goal Hits Per Die Set: | 1500000 |

Efficiency Ratings

| | |
|---|---|
| Hits Per Grind: | 117% |
| Hits Per .001 Die Grind: | 132% |
| Hits Per .001 Punch Grind: | 117% |
| Hits Per Die Set: | 75% |
| Stock Removal Rate From Die: | 0.75 |
| Stock Removal Rate From Punch: | 0.85 |

Die Performance Calculated With Short Term Data
Do You Want Die Perfromance Calculated With Long Term Data? y or n   y
Performance Now Calculated With Long Term Data GE Confidential and Proprietary © Copyright November 16, 1998

FIG. 5

DIE PERFORMANCE SPREAD SHEET

[Return to Summary] — 76, 212

Die Demographics

| | |
|---|---|
| Date of Most Recent Service: | 24-Aug-99 |
| Time Period To Date | 24-May-99  24-Aug-99 |
| Location: | DeKalb |
| Die Identification/Description: | LHC #1 |
| Enter Punch and Die Cutting Material: | Carbide |

Die Measurements

| | |
|---|---|
| Die Height at Beginnin of Time Period | 1.108 |
| Die Height as of Last Service | 1.065 |
| Punch Height at Beginning of Time Period | 0.608 |
| Punch Height as of Last Service | 0.555 |
| Total Number of Hits To Date | 13576666 |
| Total Number of Grinds To Date | 6 |
| Total Number of Times Die Set | 12 |

Performance Results

| | |
|---|---|
| Total Amount Removed From Die: | 0.043 |
| Total Amount Removed From Punch: | 0.053 |
| Average # Hits Per .001 Die Grind: | 315736 |
| Average # Hits Per .001 Punch Grind: | 256164 |
| Average # Hits Per Die Set: | 1131389 |
| Average # Hits Per Grind: | 2262778 |
| Average Amount of Die Grind: | 0.007 |
| Average Amount of Punch Grind: | 0.009 |

Benchmark Data

| | |
|---|---|
| Enter Goal Hits Per Grind: | 2000000 |
| Enter Goal Amount of Die Grind: | 0.005 |
| Enter Goal Amount of Punch Grind: | 0.005 |
| Enter Goal Hits Per Die Set: | 2000000 |

Efficiency Ratings

| | |
|---|---|
| Hits Per Grind: | 113% |
| Hits Per .001 Die Grind: | 79% |
| Hits Per .001 Punch Grind: | 64% |
| Hits Per Die Set: | 57% |
| Stock Removal Rate From Die: | 1.27 |
| Stock Removal Rate From Punch: | 1.56 |

Die Performance Calculated With Short Term Data
Do You Want Die Perfromance Calculated With Long Term Data? y or n Performance Now Calculated With Short Term Data GE Confidential and Proprietary © Copyright November 16, 1998

FIG. 6

Summary Sheet
Lamination Punch and Die Life Analysis

| Plant Location: | 14 | | | | | | | |
|---|---|---|---|---|---|---|---|---|
| GoTo New Die Data Entry Sheet | | Punch Life Remaining (Wks) | | | Check For Partial Punch Rebuild Req'mnt | Check For Full Punch Rebuild Re'qmnt | Die Life Remaining (Wks) | | Check For Partial Die Rebuild Req'mnt | Check For Full Die Rebuild Re'qmnt |
| Die Identification | Last Update | Worst Station | Ave. All Stations | | | Worst Station | Ave. All Stations | | |
| 24-16-133 (GO) | 22-Feb-99 | 393 | 716 | NOW | NOW | 511 | 511 | NOW | NOW |
| (GO) | | | | | | | | | |
| (GO) | | | | | | | | | |
| (GO) | | | | | | | | | |
| Don't Use This Button (GO) | | | | | | | | | |

GE Confidential and Proprietary © Copyright November 16, 1998

FIG. 7

METHODS AND APPARATUS FOR EVALUATING TOOL PERFORMANCE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to tool maintenance and performance and, more particularly, to methods and apparatus for evaluating tool performance and useful life.

Manufacturers typically track tool and equipment condition and useful life, to maintain tools in good operating condition and to repair or replace the tools without disrupting production schedules. Service and repair records are a primary information source from which to track tool condition. Service and repair records, however, provide only a limited picture, in that they typically describe an individual tool or piece of equipment at a single instant, i.e. the time of servicing. For example, punch and die equipment service records typically state amounts ground from, and heights remaining on, serviced punches and dies. Unless such information is placed in perspective, it is difficult to draw meaningful conclusions as to tool performance. It also is particularly difficult to analyze performance of tools and equipment in use over extended time periods in a plurality of manufacturing locations.

It would therefore be desirable to provide a method for tracking and analyzing the condition and useful life of tools and equipment over time and in a plurality of locations. It also would be desirable to provide a method for forecasting and forewarning as to upcoming needs for tool re-building or replacement.

BRIEF SUMMARY OF THE INVENTION

In an exemplary embodiment, a computer-implemented method for evaluating tool performance includes maintaining tool history data in an electronic memory, updating the tool history data with tool servicing data, determining from the tool history and servicing data a predicted tool remaining useful life, and displaying the predicted useful life on a computer output device. Average tool data is compared to tool benchmark data to determine tool efficiency. Tool servicing, performance and efficiency data are maintained in a spreadsheet format. Data entered into one spreadsheet is used to update a plurality of spreadsheets. The spreadsheet format allows manufacturers to keep abreast of tool performance over time and in a plurality of locations and to anticipate tool rebuild and replacement requirements.

BRIEF DESCRIPTION OF THE DRAWINGS

FIG. 1 is a New Die Data Entry Sheet spreadsheet;

FIG. 2 is a Die Life Data Sheet spreadsheet;

FIG. 3 is a Die Service Record spreadsheet;

FIG. 4 is a Weeks Remaining Sheet spreadsheet;

FIG. 5 is a Die Performance Sheet spreadsheet calculated with long-term data;

FIG. 6 is a Die Performance Sheet spreadsheet calculated with short-term data; and FIG. 7 is a Die Summary Sheet spreadsheet.

DETAILED DESCRIPTION OF THE INVENTION

Figure 3:
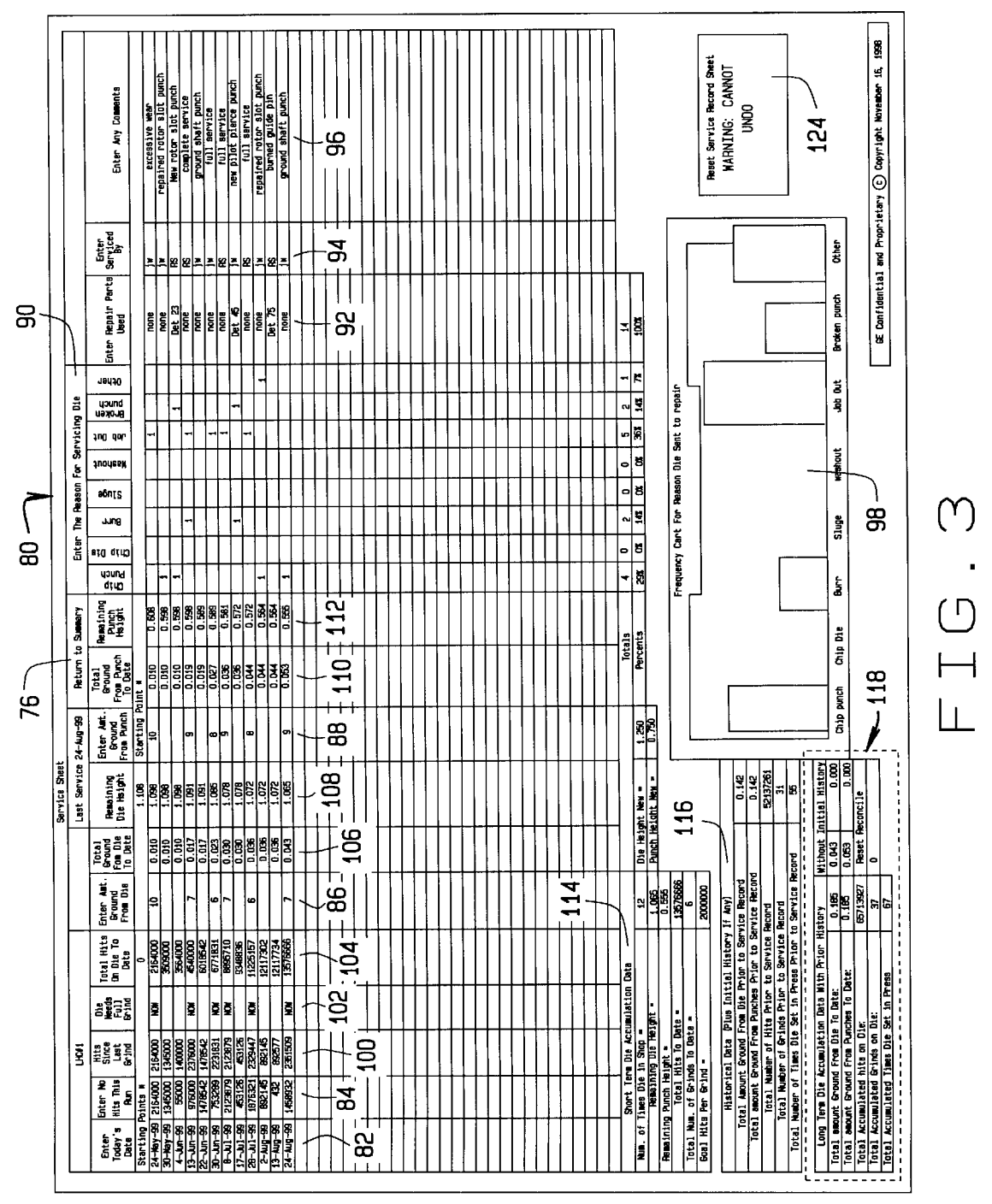

A method for evaluating tool performance is implemented by a die evaluation software program installed on a computer such as a Pentium II® running Windows 95® and having user interface (not shown), for example, a keyboard, a cathode ray tube (CRT) monitor and a mouse. Alternatively, the program could be adapted to run under LINUX or Mac OS® or other operating system. In one embodiment the die evaluation program runs under a spreadsheet program having a macro creation feature, for example, Microsoft Excel version 7 running under Microsoft Office 95. The spreadsheet program is loaded onto the computer and the die evaluation program is loaded under the spreadsheet program and saved as an Excel application program. A user enters identifying and historical information pertaining to a die and associated punches onto spreadsheets (see FIGS. 1 through 6) displayable on the CRT and which are maintained in a computer database (not shown) over time. After the user has entered initial identifying and historic data for a particular die and punches, the user enters subsequent servicing data into the database for the die and punches at times when servicing is performed.

FIG. 1 illustrates a New Die Data Entry Sheet 10 for entering initial identifying and historical information for a die and punches into the computer. Each new die is assigned a die identification number 12 when entered into the computer. The user enters die-related information into New Die Data Entry Sheet 10 by filling in, for example, a plant location cell 14, rotor and stator number cells 16, a die manufacturer cell 18, a die dimension cell 20, a service date cell 22 (i.e. date on which die was put into service), a tonnage cell 24, a strip width and thickness cell 26, a progression cell 28, a total die weight cell 30, an exit method cell 32, a die serial number cell 34, an amount punches enter die cell 36, a number of rows in die cell 38, and a die weekly line rate cell 40. Automated information entry, such as automatic gauging, bar code scanning or OCR scanning of forms can replace some of this data entry for greater speed and accuracy, if desired. Station number cells 42 identify each punch and die station in the die to be tracked by the die evaluation program. New Die Data Entry Sheet 10 includes data for each punch in a punch and die station, for example, a punch description cell 44, a punch height cell 46, a cell 48 for stripper plate thickness minus any counter-bores, and a die height cell 50. New Die Data Entry Sheet 10 also includes, for example, rotor/stator strike plate thickness cells 52, a cell 54 to indicate whether 0.090-inch punch safety margins are desired, a cell 56 for laminations per stack, cells 58 and 60 for goal amounts respectively for punch and die grinds, a cell 62 for goal number of hits per grind, a cell 64 for goal number of hits per die set, and cells 66 for other historical information predating entry of the die into the die evaluation program.

When New Die Data Entry Sheet 10 has been completed, the user activates (for example, via mouse) a Create New Worksheets Macro Button 68, to create additional spreadsheets (not shown in FIG. 1) for the newly entered die. One of the additional spreadsheets, a Die Summary Sheet (not shown in FIG. 1), can be displayed by activating a Return To Summary macro button 76. The die evaluation program automatically transfers New Die Data Entry Sheet 10 information into corresponding cells in the additional spreadsheets. For example, FIG. 2 illustrates a Die Life Data Sheet 70 displaying some of the cell data originally entered by the user into New Die Data Entry Sheet 10. Die Life Data Sheet 70 automatically includes die identification number 12, plant location cell 14, rotor and stator number cells 16, die manufacturer cell 18, die dimension cell 20, service date cell 22 (i.e. date on which die was put into service), tonnage cell 24, strip width and thickness cell 26, progression cell 28, total die weight cell 30, exit method cell 32, die serial number cell 34, and amount punches enter die cell 36. Die Life Data Sheet 70 displays data for each punch and die station in the newly entered die, for example, station number cells 42, punch description or punch and die description cells 44, punch height cells 46, stripper plate thickness minus any counter-bores cells 48 and die height cells 50. Die Life Data Sheet 70 also includes rotor/stator strike plate thickness cells 52 and cell 54 indicating whether 0.090-inch punch safety margins are desired.

The user inserts into Die Life Data Sheet 70 a standard height dimension for non-usable die life 72. A cell 74, to check for punch rebuild or repair, provides a warning message "NOW" (not shown) when 0.090-inch safety margin cell 54 has been activated and it is determined that a punch for a corresponding station has reached a value within 0.090 inches of bottoming out on a corresponding stripper plate. When 0.090-inch safety margin cell 54 has not been activated, check for punch rebuild or repair cell 74 provides a warning "LESS THAN 0.030!" (not shown) when it is determined that a punch for a corresponding station has reached a value within 0.030 inches of bottoming out on a corresponding stripper plate. If rotor/stator strike plate thickness cells 52 indicate that spring loaded interlock strike plate thickness for a die has decreased to less than 0.125 inches, check for punch rebuild or repair cell 74 also provides a "NOW" warning (not shown).

Die Life Data Sheet 70 also is automatically updated with information entered by the user, for example, into a Die Service Record 80 as shown in FIG. 3. Die Service Record 80 receives information cumulatively entered by the user to describe punch or die servicing or repair. When a die is serviced or repaired the user completes, for example, a cell 82 for current service date, a cell 84 for total number of hits on a just-completed press run, a cell 86 for amount ground from die during present servicing, a cell 88 for amount ground from punch during present servicing, a cell 90 for reason for servicing, a cell 92 for repair parts used, a cell 94 for person performing servicing, and a comments cell 96. Die Service Record 80 displays other information automatically determined by the die evaluation program when servicing information is entered onto Die Service Record 80 for a particular die. For example, the program generates a histogram 98 of frequency for reason die was sent to repair. The program also determines, for example, hits since last grind 100, whether die needs full grind 102, total hits on die to date 104, total amount ground from die to date 106, remaining die height 108, total amount ground from punch to date 110, and remaining punch height 112. Die Service Record 80 also displays short-term die accumulation data 114, historical data from prior to Die Service Record 116, and long-term die accumulation data 118 (a combination of short-term die accumulation data 114 with historical data from prior to Die Service Record 116). When, for example, Die Service Record 80 has been filled, the user can activate Reset Service Record macro button 124 to make room for entering additional servicing information and to update long-term die accumulation data cells 118.

The die evaluation program uses information from Die Service Record 80 to update Die Life Data Sheet 70 (shown in FIG. 2). For example, Die Life. Data Sheet 70 cells for total amount ground from punch to date 110 and total amount ground from die to date 106 are automatically updated each time Die Service Record 80 is updated. Cells for remaining usable punch life 120 and remaining usable die life 122 also are determined from Die Service Record 80 data. Cell 120 for remaining usable punch life is linked to 0.090 safety margin cell 54 and will display values including safety margins if the user has activated cell 54. Cell 122 for remaining usable die life is linked to cell 72 for standard height dimension for non-usable die life and will display values determined by the die evaluation program using cell 72 value.

Figure 4:
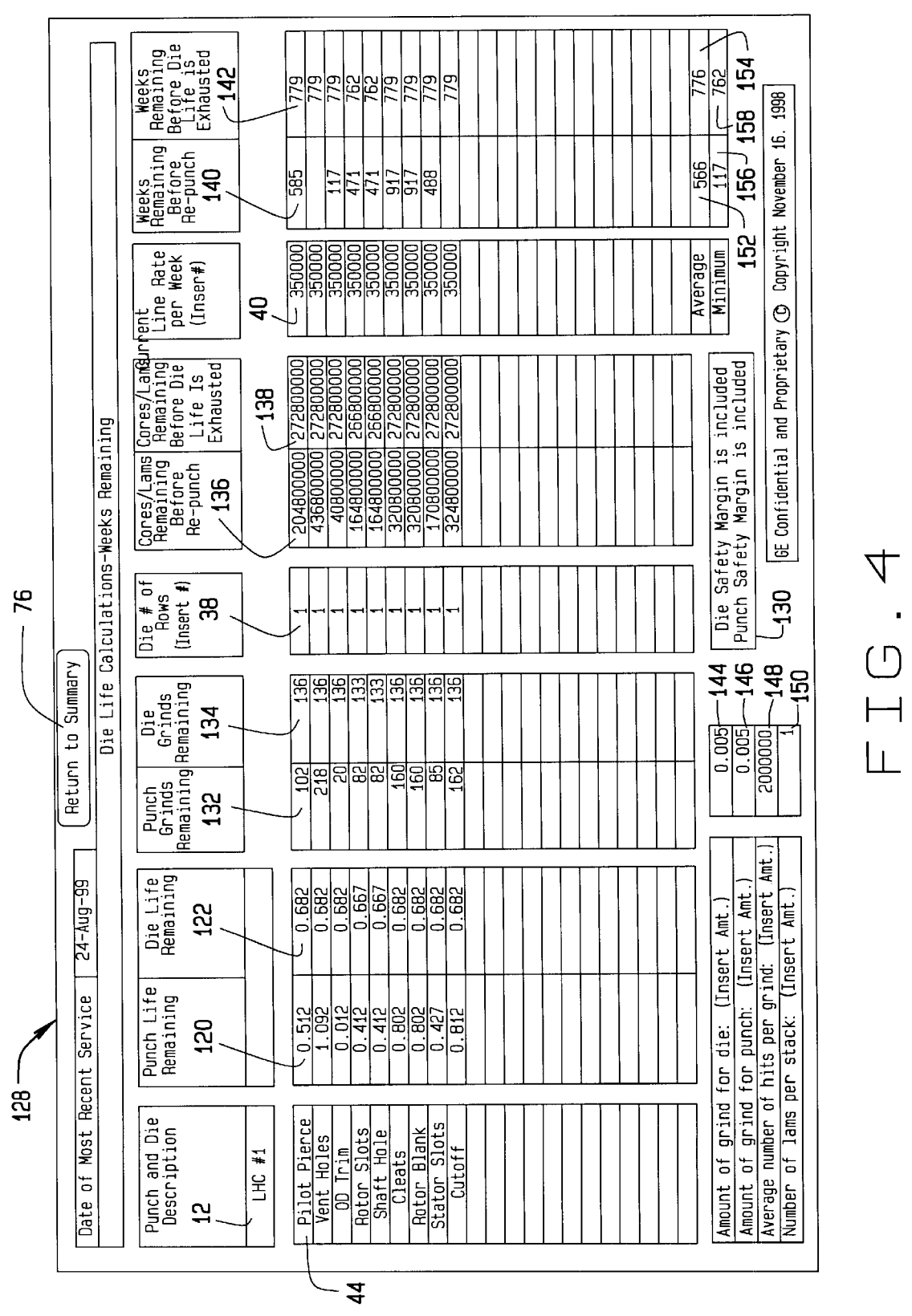

The die evaluation program uses information in Die Service Record 80, Die Life Data Sheet 70 and New Die Data Entry Sheet 10 (shown in FIG. 1) to determine a die useful life in terms of weeks remaining. For example, FIG. 4 illustrates a Weeks Remaining Sheet 128 including data determined from Die Service Record 80 and data transferred from New Die Data Entry Sheet 10 and Die Life Data Sheet 70. Weeks Remaining Sheet 128 includes data for each punch and die station in the die identified by identification number 12, for example, punch and die description 44, punch life remaining 120, and die life remaining 122. The die evaluation program determines cells 132 for punch grinds remaining, cells 134 for die grinds remaining, cells 136 for cores or laminations remaining before re-punch, cells 138 for cores or laminations remaining before die life is exhausted, cells 140 for weeks remaining before re-punch, and cells 142 for weeks remaining before die life is exhausted. The die evaluation program makes the foregoing determinations based on values in cells 144 for average amount of punch grind, cells 146 for average amount of die grind, cells 148 for average number of hits per grind, and cells 150 for number of laminations. Weeks Remaining Sheet 128 displays a safety margin indicator 130 indicating whether safety margin cell 54 has been activated from Die Life Data Sheet 70 (shown in FIG. 2). Values in cells 144, 146, 148 and 150 are entered by the user. The program also determines values for cell 152 for average number of weeks remaining before re-punch, cell 154 for average number of weeks remaining before die life is exhausted, cell 156 for minimum number of weeks remaining before re-punch and cell 158 for minimum number of weeks remaining before die life is exhausted. Weeks Remaining Sheet 128 also displays New Die Data Entry Sheet 10 cells 38 for die number of rows and 40 for current weekly line rate.

FIG. 5 illustrates a Die Performance Sheet 170 including sections 212, 174, 176, 178 and 196 for die demographics, die measurements, benchmark data, performance results, and efficiency ratings. The user activates cell 210 to select whether information on Die Performance Sheet 170 is to be determined with short-term or long-term data maintained in Die Service Record 80. FIG. 5 depicts Die Performance Sheet 170 with long-term data selected, and FIG. 6 depicts Die Performance Sheet 170 with short-term data selected. Section 212 includes cells for plant location 14, date of most recent service 82 (from Die Service Record 80), and time period to date 172. If the user selects short-term data via cell 210, time period to date 172 is determined as a time period between earliest service date 82 shown on Die Service Record 80 and most recent service date 82. If long-term data is selected, time period to date 172 is determined as a time period between date die was put into service 22 and most recent service date 82. Die and punch measurements 174 over time period to date 172 are automatically entered into Die Performance Sheet 170 from Die Service Record 80 and include, for example, a total number of hits to date cell 214.

Benchmark data 176 include a cell 160 for goal hits per grind, a cell 162 for goal amount of die grind, a cell 164 for goal amount of punch grind, and a cell 166 for goal hits per die set. Benchmark data 176 values are included automatically from New Die Data Entry Sheet 10, but the user can enter different benchmark values 176 onto Die Performance Sheet 170. Performance results 178 are determined from, for example, Die Service Record 80 information. Performance results 178 include, for example, cells for total amount removed from die 180, total amount ground from punch 182, average number of hits per 0.001 die grind 184, average number of hits per 0.001 punch grind 186, average number of hits per die set 188, average number of hits per grind 190, average amount of die grind 192, and average amount of punch grind 194.

Cells 196 for efficiency ratings are determined by comparing performance results 178 to benchmark data 176. Efficiency ratings include, for example, a ratio 198 of actual average hits per grind to goal hits per grind 160, a ratio 200 of actual average number of hits per 0.001 die grind to benchmark data 176, a ratio 202 of actual average number of hits per 0.001 punch grind to benchmark data 176, a ratio 204 of actual average number of hits per die set to goal hits per die set 166, a ratio 206 of actual average amount removed from die during routine service to benchmark data 176 (i.e. stock removal rate from die), and a ratio 208 of actual average amount removed from punch during routine service to benchmark data 176 (i.e. stock removal rate from punch).

Die Performance Sheet 170 summarizes and analyzes a plurality of data from, for example, New Die Data Entry Sheet 10 and Die Service Record 80 and thus provides insights into die performance relative to general industry-accepted benchmarks. For example, ratio 198 of average hits per grind to goal hits per grind 160 provides insight into whether a die is being ground prematurely based on industry norms, whether a die is being serviced correctly and at appropriate intervals, and whether punch or die washout is occurring. Ratio 200 of hits per 0.001 die grind to benchmark data 176 provides insight into die lower half consumption rate and whether die washout is occurring. Ratio 202 of hits per 0.001 punch grind to benchmark data 176 provides insight into die upper half (i.e. punch) consumption rate and whether punch washout is occurring. Ratio 204 of hits per die set to goal hits per die set 166 provides insight into how well a die is designed, built, maintained and suited to press capacity. Hits per die set ratio 204 is affected by, for example, poor die maintenance, punch press overload, improper grinding procedures and off-center punch press loading. Stock removal rate from die ratio 206 and stock removal rate from punch ratio 208 are factors providing insight into punch and die consumption rates and whether sharpening is inadequate or excessive. Stock removal rate from die ratio 206 is a ratio of (total number of hits to date 214 divided by total amount removed from die 180) to (goal hits per grind 160 divided by goal amount of die grind 162). Stock removal rate from punch ratio 208 is a ratio of (total number of hits to date 214 divided by total amount removed from punch 182) to (goal hits per grind 160 divided by goal amount of punch grind 164).

FIG. 7 illustrates a Die Summary Sheet 220, which supplies, in summary form, cells for punch life 222 and die life 224 in terms of weeks remaining. Die Summary Sheet 220 includes, for example, a list 226 of dies at plant location 14 and is automatically updated when a Die Service Record 80 is updated. Die Summary Sheet 220 also includes cells 228, 230, 232 and 234 for checks for partial and full punch and die rebuild requirements. Cells 228, 230, 232 and 234 automatically determine need for and display a warning 236 for such rebuild requirement. The user can activate macro button 238 for a die identification number 12 in list 226 to view Die Service Record 80 corresponding to die identification number 12.

The above-described method provides a range of useful information, from aspects of a particular servicing occasion to long-term tool performance and efficiency in a plurality of locations. The user thereby gains a broadened perspective on tool consumption and servicing that can serve to inform the user's selection of tools and suppliers. User access to tool information is enhanced by installing the die evaluation program for use over a computer network, for example, an intranet or internet. The tool data in spreadsheet format also is amenable to further analysis with available spreadsheet methods, for example, to uncover hidden costs associated with poor tool maintenance or operating procedures.

The above-described computer-implemented method is modifiable in a plurality of aspects and is applicable for tracking many items in addition to punch/die tooling. While the invention has been described in terms of various specific embodiments, those skilled in the art will recognize that the invention can be practiced with modification within the spirit and scope of the claims.

What is claimed is:

1. A computer-implemented method for predicting tool performance, said method comprising the steps of:

maintaining tool history data in an electronic memory;

updating the tool history data with tool servicing data;

determining from the tool history data and the tool servicing data a predicted tool remaining useful life; and displaying said remaining useful life on a computer output device.

2. A method in accordance with claim 1 wherein the tool history data and the tool servicing data include average tool data and benchmark data, said method further comprising the step of comparing the average tool data to the benchmark data to determine tool efficiency.

3. A method in accordance with claim 2 further comprising the step of maintaining tool history data and tool servicing data for a plurality of locations.

4. A method in accordance with claim 3 further comprising the step of maintaining tool history data and tool servicing data in a spreadsheet format.

5. A method in accordance with claim 4 further comprising the step of analyzing punch and die performance.

6. A method in accordance with claim 4 further comprising the step of entering data into at least one spreadsheet to update a plurality of spreadsheets.

7. A method in accordance with claim 2 further comprising the step of determining future tool servicing requirements from the tool history data and the tool servicing data.

8. A method in accordance with claim 7 wherein the step of determining future tool servicing requirements from the tool history data and the tool servicing data comprises the step of applying safety margins to the tool history data and the tool servicing data.

9. A computer-based system for evaluating tool performance, said system comprising at least one computer configured to store tool history data and tool servicing data, said system configured to maintain the tool history data, update the tool history data with the tool servicing data and determine from the tool history data and the tool servicing data a predicted tool remaining useful life.

10. A system in accordance with claim 9 wherein the tool history data and the tool servicing data include tool performance data and benchmark data, said system further configured to compare the tool performance data to the benchmark data to determine tool efficiency.

11. A system in accordance with claim 10 further configured to maintain tool history data and tool servicing data for a plurality of locations.

12. A system in accordance with claim 11 further configured to maintain tool history data and tool servicing data in a spreadsheet format.

13. A system in accordance with claim 12 further configured to analyze punch and die performance.

14. A system in accordance with claim 12 further configured to update a plurality of spreadsheets from the data in at least one spreadsheet.

15. A system in accordance with claim 12 further configured to use the data in at least one spreadsheet to create at least one additional spreadsheet.

16. A system in accordance with claim 10 further configured to determine future tool servicing requirements from the tool history data and the tool servicing data.

17. A system in accordance with claim 16 wherein said system configured to determine future tool servicing requirements from the tool history data and the tool servicing data comprises being configured to apply safety margins to the tool history data and the tool servicing data.

* * * * *